United States Patent
Schnetzka et al.

(10) Patent No.: US 7,640,767 B2
(45) Date of Patent: Jan. 5, 2010

(54) LOW VOLTAGE VARIABLE SPEED DRIVE FOR APPLICATION ON MEDIUM/HIGH VOLTAGE MAINS

(75) Inventors: Harold R. Schnetzka, York, PA (US); Dean K. Norbeck, Marco Island, FL (US)

(73) Assignee: Johnson Controls Technology Company, Holland, MI (US)

( * ) Notice: Subject to any disclaimer, the term of this patent is extended or adjusted under 35 U.S.C. 154(b) by 350 days.

(21) Appl. No.: 11/422,964

(22) Filed: Jun. 8, 2006

(65) Prior Publication Data

US 2007/0283708 A1  Dec. 13, 2007

(51) Int. Cl.
F25D 17/02 (2006.01)
(52) U.S. Cl. ........................ 62/434; 62/259.2
(58) Field of Classification Search .............. 62/228, 62/236, 434
See application file for complete search history.

(56) References Cited

U.S. PATENT DOCUMENTS

| | | | |
|---|---|---|---|
| 3,954,915 A * | 5/1976 | Schwab et al. | 525/123 |
| 3,959,704 A | 5/1976 | McCrea | |
| 4,084,406 A | 4/1978 | Brenneman | |
| 4,147,296 A | 4/1979 | Spethmann | |
| 4,270,361 A | 6/1981 | LaBarge | |
| 4,425,539 A | 1/1984 | Wills | |
| 4,674,024 A | 6/1987 | Paice et al. | |
| 4,895,005 A | 1/1990 | Norbeck et al. | |
| 5,355,691 A | 10/1994 | Sullivan et al. | |
| 5,361,587 A | 11/1994 | Hoffman | |
| 5,625,545 A | 4/1997 | Hammond | |
| 5,746,062 A * | 5/1998 | Beaverson et al. | 62/228.3 |
| 5,838,144 A | 11/1998 | Wills et al. | |
| 6,346,790 B1 | 2/2002 | Kemp et al. | |
| 6,449,973 B2 * | 9/2002 | Dodge et al. | 62/240 |
| 6,564,560 B2 | 5/2003 | Butterworth et al. | |
| 6,679,076 B1 | 1/2004 | Duga et al. | |
| 7,003,971 B2 * | 2/2006 | Kester et al. | 62/259.2 |
| 2005/0225270 A1 * | 10/2005 | Schnetzka et al. | 318/66 |

* cited by examiner

*Primary Examiner*—Melvin Jones
(74) *Attorney, Agent, or Firm*—McNees Wallace & Nurick LLC

(57) ABSTRACT

The present invention is directed to a power transformer and VSD mounted on the chiller equipment. The transformer is preferably a liquid-filled transformer rated for medium/high voltage input, and at least two output low voltages, one voltage for the VSD and other power equipment, and another voltage for the control panel and control equipment. The placement of the power transformer on the chiller eliminates the need to allocate additional floor space for an auxiliary transformer or medium/high voltage VSD. The transformer also includes cooling means in the form of a heat exchanger in which the liquid is cooled by circulating condenser water, chilled water or refrigerant from the chiller system. The cooling means may also be connected to cooling coils connected to the VSD. The size of the power transformer is significantly reduced by the use of the chiller system to remove heat from the transformer while in operation, thereby maintaining the ambient temperature rise of the transformer within its rated operating temperature range. The transformer and VSD heat is discharged to the outside ambient eliminating additional cooling requirements for the equipment room.

14 Claims, 4 Drawing Sheets

LOW VOLTAGE VARIABLE SPEED DRIVE FOR APPLICATION ON MEDIUM/HIGH VOLTAGE MAINS

FIELD OF THE INVENTION

The present invention is directed to a variable speed drive powered from medium/high voltage mains, and more particularly to a low voltage variable speed drive powered by a medium/high voltage, fluid or gas cooled transformer.

BACKGROUND OF THE INVENTION

Chiller systems for applications in commercial or industrial building HVAC systems typically include relatively large electric motors for powering a compressor. The motors may range in horsepower from 100 HP up to 5,000 HP or larger. Many of these systems include variable speed drives (VSD) for controlling the speed of the motor in response to cooling demand. Motors and VSDs of this size must be designed for the applicable main distribution voltages. In the case where low voltage mains (600 volts or less) are supplying the chiller system, higher current capacity is required. The relatively high current load requires larger more expensive cables, step-down transformers, and switchgear.

Conversely, where the voltage main supplies medium/high voltage (greater than 600 volts) to the chiller system, the current capacity requirements are low relative to the low voltage system requirements. However, other considerations such as equipment costs, complexity and safety must also be taken into account. Medium/high voltage (MV) switchgear, typically 4,160V, requires sophisticated arc suppression, insulation, and safety characteristics. Moreover, because of the greater potential danger of electrocution, only specially trained and qualified maintenance personnel may be permitted to perform the highly specialized maintenance operations of the medium/high voltage distribution system. Corona, flashover and arcing are some of the adverse factors associated with medium/high voltage distribution systems. The presence of moisture and dust particles further contributes to the adverse factors, resulting in increased switchgear costs. Additionally, power semiconductors are not generally available for medium/high voltage applications, and require especially high reverse-voltage characteristics, further adding to the increased cost size and complexity of such equipment.

An electric system suitable for a typical low voltage chiller system, due to high current requirements, can include large expensive conductors, switchgear and transformers for a low voltage distribution system. Alternatively, due to the lower current requirements, the components of the medium/high voltage switchgear could be smaller; however, due to the higher voltage significantly greater equipment clearances are required. As a result, there is no space saving advantage associated with the medium/high voltage switchgear and drives.

Floor mounted medium/high voltage drives and starters are commercially available. One such motor drive is a model T300 MVi manufactured by the Toshiba International Corporation. The T300 MVi variable speed drive arrangement includes a rather complex 24 pulse input transformer having 12 three-phase secondary windings to supply the drive input rectifiers, plus two secondary windings for two control voltage levels. The floor area required to accommodate most medium/high voltage VSDs, including the T300MVi, is approximately 50 ft.$^2$ to 100 ft.$^2$, which in many instances is equal to or greater than the floor area required for the chiller. Due to the limited floor area allocated for HVAC systems in buildings, it is desirable to minimize the floor area utilized by the chiller system, while maintaining an appropriately sized chiller system.

U.S. Pat. No. 5,625,545 discloses an electric drive apparatus and method for controlling medium/high-voltage alternating current motors wherein a multi-phase power transformer supplies multi-phase power to multiple power cells. In one embodiment of the '545 patent which can be applied to 2300 VAC inductive motor loads, three power cells are used for each of the three phase output lines. In another embodiment, which may be applied to a 4160 VAC inductive motor load, five power cells may be used for each of the three phase output lines. Such an embodiment can have eleven voltage states. Such multiple power cell transformers are more costly and consume an excessive amount of space to accommodate the large number of cells and clearances space required for medium/high voltage motors. As a result they require separate mounting cabinets and cannot be mounted directly on the chiller equipment to save floor space.

Therefore, there is a need for a low voltage chiller system that can be connected to a medium/high voltage AC power source with a step-down transformer that is sufficiently compact to permit the transformer to be mounted directly on the chiller, integral with the VSD.

SUMMARY OF THE INVENTION

The present invention is directed to a power transformer and VSD mounted on the chiller equipment. The transformer is preferably a liquid-filled transformer rated for medium/high voltage input, and at least two output low voltages, one voltage for the VSD and other power equipment, and other voltages for the control panel and control equipment. The placement of the power transformer on the chiller eliminates the need to allocate additional floor space for an auxiliary transformer. The transformer also includes cooling means in the form of a heat exchanger in which the liquid is cooled by circulating condenser water, chilled water or refrigerant from the chiller system. The cooling means may also be connected to cooling coils connected to the VSD. The size of the power transformer is significantly reduced by the use of the chiller system cooling system to remove heat from the transformer while in operation, thereby maintaining the ambient temperature rise of the transformer within its rated operating temperature range.

One embodiment of the invention is directed to a chiller system. The chiller system includes a refrigerant circuit. The refrigerant circuit includes a compressor, a condenser, and an evaporator connected in a closed refrigerant loop. The refrigerant circuit is configured and disposed as a unit. A transformer is configured for connection to medium AC voltage input mains and low AC voltage output. The transformer has a fluid path therethrough in fluid communication with a cooling circuit. A variable speed drive is connected to the output of the transformer. The variable speed drive is configured to power a motor of the compressor. The transformer and the variable speed drive are mounted on the unit.

An advantage of the present invention is the ability to provide a refrigeration system having low cost low-voltage electrical components, which can be connected directly to a medium/high-voltage electrical distribution system.

Another advantage of the present invention is that it provides a compact MV transformer that may be mounted on the chiller shells together with the VSD minimizing chiller floor space.

A further advantage of the present invention is the elimination of a power conduits, e.g., between the transformer and VSD, and between the VSD and motor.

Yet another advantage of the present invention is the elimination of the field wiring bending space and the incoming disconnect switch or circuit breaker within the VSD, to provide a less expensive, more compact VSD.

Still another advantage of the present invention is the direct transfer of the power transformer and VSD heat losses into the chiller system, avoiding rejection of the losses into the equipment room, thus maintaining lower ambient temperature of the environment.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
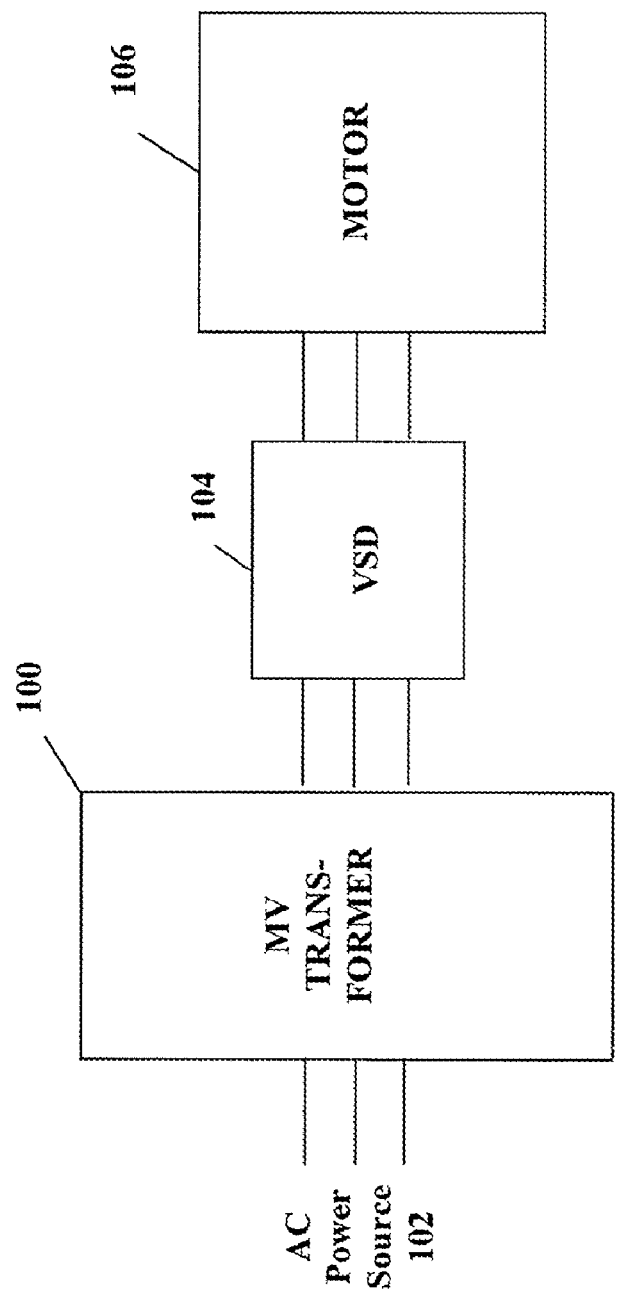
FIG. 1 illustrates schematically a general system configuration of the present invention.

FIG. 1 illustrates generally the system configuration of the present invention. An AC power source 102 supplies AC power to a medium/high voltage (MV) transformer 100. The MV transformer 100 supplies low voltage AC power to a variable speed drive (VSD) 104, which in turn, supplies AC power to a motor 106. The motor 106 is preferably used to drive a corresponding compressor of a refrigeration or chiller system (see generally, FIG. 3). The AC power source 102 provides multi-phase (e.g., three phase), fixed medium/high voltage (e.g., greater than 600 volt), and fixed frequency AC power to the VSD 104 from an AC power mains or distribution system that is present at a site. The AC power mains can be supplied directly from an electric utility or can be supplied from one or more transforming substations between the electric utility and the AC power mains. The AC power source 102 can preferably supply a three-phase AC medium/high voltage or nominal line voltage of greater than 600V, preferably 3300V or 4160V, at a nominal line frequency of 50 Hz or 60 Hz to the primary of the MV transformer 100. The MV transformer 100 in turn supplies a fixed secondary voltage of 200 V, 230 V, 380 V, 460 V, or 600 V to the VSD 104 at the corresponding primary frequency, depending on the corresponding AC power mains. It is to be understood that while the AC power source 102 can provide any suitable fixed nominal line voltage or fixed nominal line frequency to the MV transformer 100 depending on the configuration of the AC power mains, the embodiments of the present invention are applicable in general to an AC power source having a nominal voltage greater than 600V, and preferably greater than 2000V.

The MV transformer 100 receives AC power having medium/high voltage and fixed line frequency from the AC power source 102. The MV transformer 100 may preferably be a liquid-filled transformer, in which the liquid acts as an insulator and cools the unit, while transferring heat to the chiller system. The MV transformer 100 provides low voltage output or secondary AC power (e.g., 200 V, 230 V, 380 V, 460 V, or 600 V), to the VSD 104, and auxiliary control equipment. The MV transformer 100 (see FIG. 2A) may also include one or more tertiary windings for single-phase or three-phase low voltage (less than 600V AC) control power. The VSD 104 provides AC voltage to the motor 106 at a desired voltage and desired frequency, both of which can be varied to satisfy particular requirements. Preferably, the VSD 104 can provide AC power to the motor 106 having higher voltages and frequencies or lower voltages and frequencies than the fixed voltage and fixed frequency received from the MV transformer 100 secondary voltage. The motor 106 may have a predetermined rated voltage and frequency that is greater than the MV transformer 100 fixed secondary voltage and frequency, however the rated motor voltage and frequency may also be equal to or lower than the MV transformer 100 fixed secondary voltage and frequency.

Figure 2:
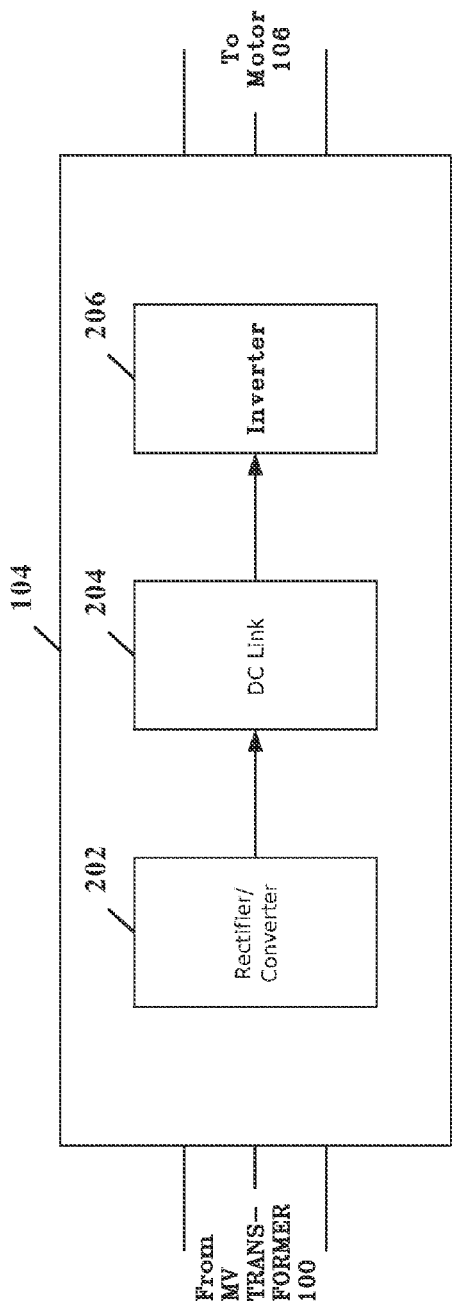
FIG. 2 illustrates schematically an embodiment of variable speed drive of the present invention.
Figure 2A:
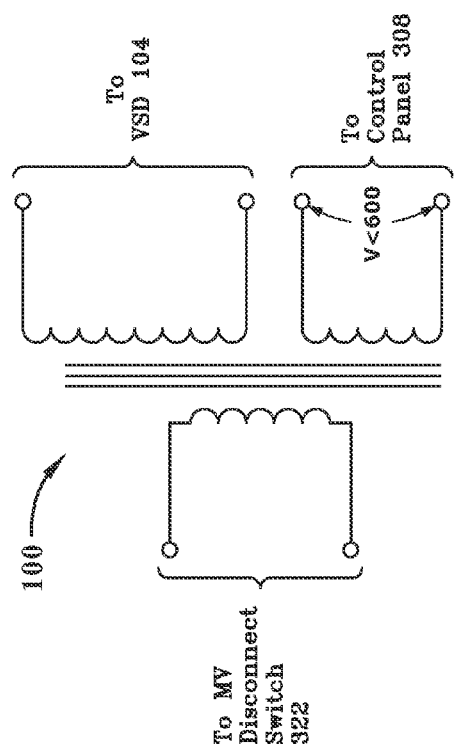
FIG. 2A illustrates schematically a transformer with a tertiary winding connected to a control panel.

FIG. 2 illustrates schematically some of the components in one embodiment of the VSD 104. The VSD 104 can have three stages: a converter stage 202, a DC link stage 204 and an inverter stage 206. The converter 202 converts the fixed line frequency, fixed line voltage AC power from the transformer 100 into DC voltage. The DC link 204 filters the DC voltage from the converter 202 and provides energy storage components such as capacitors and/or inductors. Finally, the inverter 206 converts the DC voltage from the DC link 204 into variable frequency, variable voltage AC power for the motor 106. The VSD 104 may be a conventional VSD with a non-boosted DC link voltage, i.e., the maximum output voltage/frequency is equal to the input line voltage/frequency. Alternately, the VSD 104 may be a VSD that includes an active converter, i.e., the active converter provides a boosted DC link, wherein the boosted DC link has a value greater than the peak of the input AC low voltage into the VSD and the VSD's maximum output voltage/frequency is greater than the input AC voltage/frequency of the low voltage secondary of the transformer. A more detailed explanation of the operation of the active converter configured to boost the DC link voltage of the VSD is contained in U.S. patent application Ser. No. 11/218,757 filed Sep. 2, 2005, entitled "A Ride-Through Method And System For HVAC&R Chillers", and in U.S. patent application Ser. No. 11/123,685 filed May 6, 2005, entitled "Variable Speed Drive For A Chiller System", both of which patent applications are commonly assigned, and are hereby incorporated by reference.

Figure 3:
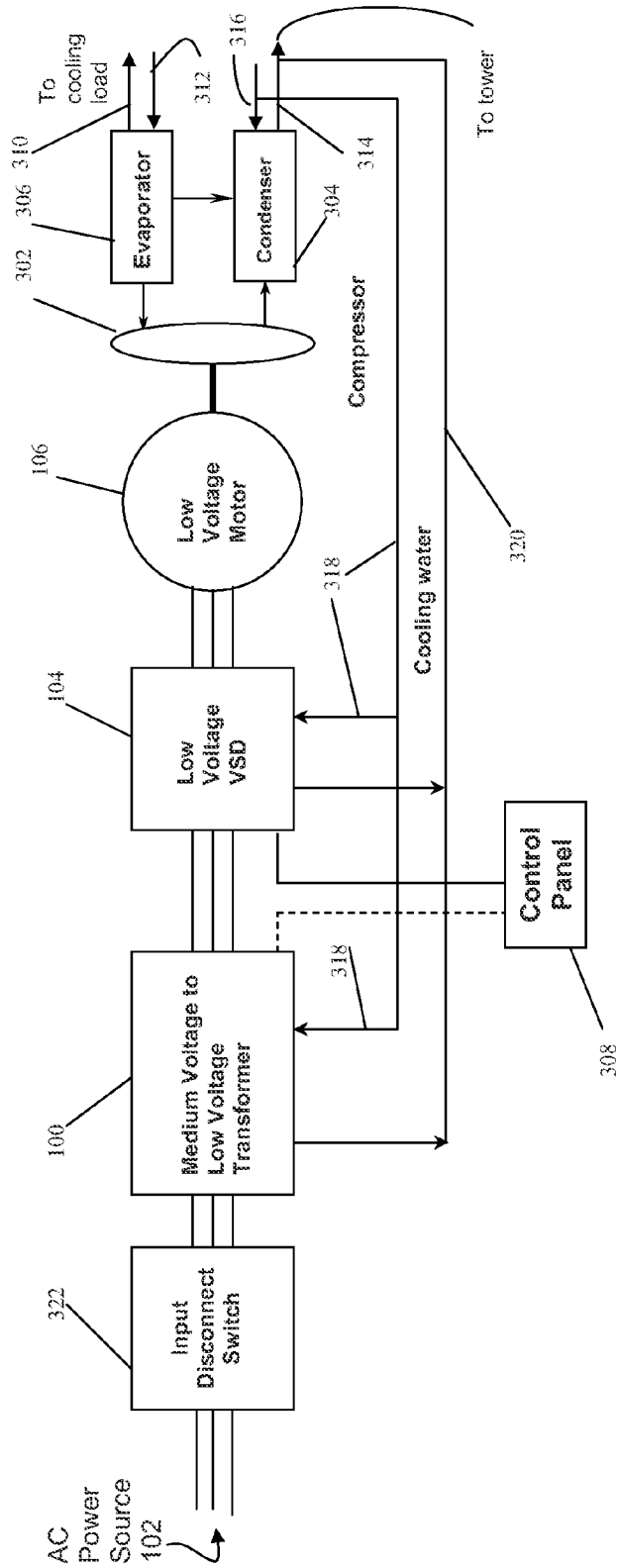
FIG. 3 illustrates schematically a chiller cooling system that can be used with the present invention.

The motor 106 is preferably an induction motor that is capable of being driven at variable speeds. The induction motor can have any suitable pole arrangement including two poles, four poles or six poles. The induction motor is used to drive a load, preferably a compressor as shown in FIG. 3. In one embodiment of the present invention, the system and method of the present invention can be used to drive a compressor of a refrigeration system.

FIG. 3 illustrates generally the system of the present invention connected to a refrigeration system. As shown in FIG. 3, the HVAC, refrigeration or liquid chiller system 300 includes a compressor 302, a condenser 304, an evaporator 306, and a control panel 308. The control panel 308 can include a variety of different components such as an analog to digital (A/D) converter, a microprocessor, a non-volatile memory, and an interface board, to control operation of the refrigeration system 300. The control panel 308 can be used to control the operation of the VSD 104 and the motor 106, as well as other components of the chiller system 300. In a preferred embodiment, the chiller structure permits the stacking or vertical arrangement of the major components on top of the chiller cooling system 300 to provide a prepackaged unit that occupies less floor space with a smaller footprint than a field fabricated unit where the components are arranged horizontally.

Compressor 302 compresses a refrigerant vapor and delivers the vapor to the condenser 304 through a discharge line. The compressor 302 is preferably a centrifugal compressor, but can be any suitable type of compressor, e.g., screw compressor, reciprocating compressor, etc. The refrigerant vapor delivered by the compressor 302 to the condenser 304 enters into a heat exchange relationship with a fluid, e.g., air or water, flowing through a heat-exchanger coil connected to a cooling tower (not shown). The refrigerant vapor in the condenser 304 undergoes a phase change to a refrigerant liquid as a result of the heat exchange relationship with the fluid. The condensed liquid refrigerant from condenser 304 flows through an expansion device (not shown) to an evaporator 306.

The evaporator 306 includes connections for a supply line 310 and a return line 312 of a cooling load. A secondary liquid, e.g., water, ethylene, calcium chloride brine or sodium chloride brine, travels into the evaporator 306 via return line 312 and exits the evaporator 306 via supply line 310. The liquid refrigerant in the evaporator 306 enters into a heat exchange relationship with the secondary liquid to lower the temperature of the secondary liquid. The refrigerant liquid in the evaporator 306 undergoes a phase change to a refrigerant vapor as a result of the heat exchange relationship with the secondary liquid. The vapor refrigerant in the evaporator 306 exits the evaporator 306 and returns to the compressor 302 by a suction line to complete the cycle. It is to be understood that any suitable configuration of condenser 304 and evaporator 306 can be used in the system 300, provided that the appropriate phase change of the refrigerant in the condenser 304 and evaporator 306 is obtained.

The condenser fluid, preferably water, exits the condenser 304 via a return line 314 connected to a cooling tower (not shown), and is circulated from the cooling tower to the condenser 304 via supply line 316. In a preferred embodiment, condenser water is supplied to the low voltage VSD 104 and MV transformer 100 from the condenser 304 via a supply line 318 connected to supply line 316. Supply line 318 supplies cooling water to the VSD 104 and to the MV transformer 100. Piping is preferably installed within each of VSD 104 and the MV transformer 100 for circulation of the condenser water, which absorbs heat generated by the electrical components. A return line 320 is connected to the return line 314 to complete the condenser water circuit from the VSD 104 and the MV transformer 100. The heated condenser water from the VSD 104 and the MV transformer 100 is mixed with the condenser water in return line 314 and pumped to the cooling tower. Alternatively, chilled water, refrigerant or similar fluids may be used instead of condenser water to cool the MV transformer 100, VSD 104.

A medium/high voltage disconnect switch 322 is disposed ahead of the MV transformer 100 to disconnect the MV transformer 100 from the input AC power line 102. The purpose of the disconnect switch 322 is to comply with applicable electrical or fire codes that require a local disconnect means for MV equipment. Preferably, the MV disconnect switch 322 is integrated with or attached to the MV transformer 100 as a single package.

The HVAC, refrigeration or liquid chiller system 300 can include many other features that are not shown in FIG. 3. These features have been purposely omitted to simplify the drawing for ease of illustration. Furthermore, while FIG. 3 illustrates the HVAC, refrigeration or liquid chiller system 300 as having one compressor connected in a single refrigerant circuit, it is to be understood that the system 300 can have multiple compressors, powered by a single VSD or multiple VSDs, connected into each of one or more refrigerant circuits.

Preferably, a control panel, microprocessor or controller can provide control signals to the VSD 104 to control the operation of the VSD 104 (and thereby the motor 106) to provide the optimal operational setting for the VSD 104 and motor 106 depending on the particular sensor readings received by the control panel. For example, in the refrigeration system 300 of FIG. 3, the control panel 308 can adjust the output voltage and frequency of the VSD 104 to correspond to changing conditions in the refrigeration system, i.e., the control panel 308 can increase or decrease the output voltage and frequency of the VSD 104 in response to increasing or decreasing load conditions on the compressor 302 in order to obtain a desired operating speed of the motor 106 and a desired load output of the compressor 302.

Figure 4:
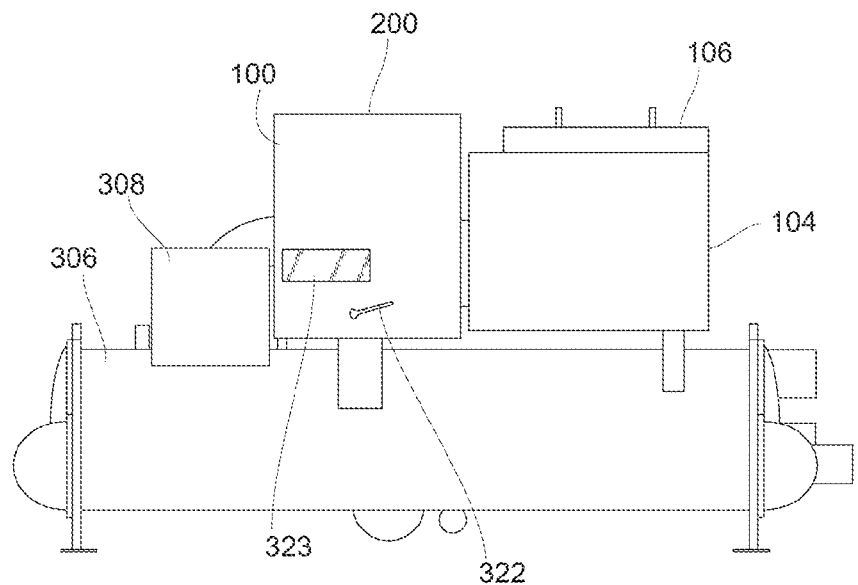
FIG. 4 illustrates an elevational view of a chiller system arrangement.
Figure 5:
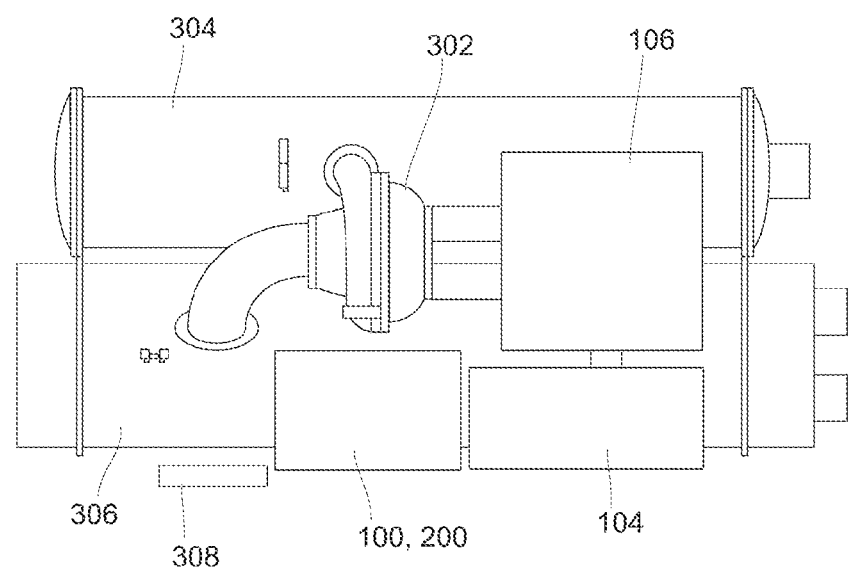
FIG. 5 illustrates a plan view of a chiller system arrangement.

Referring next to FIGS. 4 and 5, an exemplary physical layout of the MV transformer 100, the MV disconnect switch 322 and VSD 104 is provided. MV transformer 100 and disconnect switch 322 are disposed within an enclosure 200. The enclosure 200, control panel 308 and the VSD 104, are all mounted on top of the chiller cooling system 300. The condenser 304 has an exterior shell and the evaporator 306 has an exterior shell. The compressor 302 and the motor 106 are integrally mounted on at least one of the condenser and evaporator shells. A low voltage VSD 104—e.g., rated less than 600VAC input—is mounted on at least one of the exterior shells and physically attached directly to the motor, 106, thereby eliminating the need for a motor terminal box and an electrical power conduit connecting the VSD 104 and motor 106. The MV transformer 100, is also mounted on at least one of the condenser and evaporator shells. The MV transformer 100 is physically directly attached to the VSD 104. By directly attaching the MV transformer to the VSD 104, the space requirement is reduced, because the incoming field wire and conduit bending space requirement, the VSD input disconnect switch or circuit breaker, and the electrical power conduit between the transformer and VSD are all eliminated. By arranging the MV transformer 100, disconnect switch 322, and other components on top of the chiller system 300, it is possible to mount all of the components of the system on a single packaged system, as discussed above. There is a window 323 provided in the cabinet of the disconnect switch 322 to allow viewing of the disconnect switch blades so that the technician can be assured they are open. This window feature is standard on all medium/high voltage equipment.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the appended claims.

The invention claimed is:

1. A chiller system comprising:
   a refrigerant circuit comprising compressor, a condenser, and an evaporator connected in a closed refrigerant loop, the refrigerant circuit being configured and disposed as a unit;
   a transformer configured for connection to a medium/high AC voltage input mains and low AC voltage output, the transformer having a fluid path therethrough in fluid communication with a cooling circuit; a variable speed drive connected to the output of the transformer, the variable speed drive configured to power a motor of the compressor; the transformer and the variable speed drive mounted on the unit; and
   the transformer being configured to provide at least two output low voltage levels, a first output low voltage level for the variable speed drive and other power equipment, and a low voltage for the control panel and control equipment.

2. A chiller system comprising:
   a refrigerant circuit comprising compressor, a condenser, and an evaporator connected in a closed refrigerant loop, the refrigerant circuit being configured and disposed as a unit;
   a transformer configured for connection to a medium/high AC voltage input mains and low AC voltage output, the transformer having a fluid path therethrough in fluid communication with a cooling circuit; a variable speed drive connected to the output of the transformer, the variable speed drive configured to power a motor of the compressor; the transformer and the variable speed drive mounted on the unit; and
   the transformer includes insulating heat transfer liquid or gas for cooling the transformer.

3. The chiller system of claim 1, wherein the variable speed drive includes a fluid path therethrough connected in a heat exchange relation with a fluid selected from the group consisting of:
   condenser water, chilled water and refrigerant.

4. The chiller system of claim 1, wherein the transformer includes a fluid path therethrough connected in a heat exchange relation with a fluid selected from the group consisting of:
   condenser water, chilled water and refrigerant.

5. The chiller system of claim 1, wherein the variable speed drive also includes:
   a converter stage connected to a low voltage AC output of the transformer providing a fixed input AC voltage to the variable speed drive, the converter stage of the variable speed drive being configured to convert the fixed input AC voltage to a boosted DC voltage greater than the peak value of the fixed input AC voltage;
   a DC link connected to the converter stage, the DC link being configured to filter the boosted DC voltage and store energy from the converter stage; and
   a first inverter stage connected to the DC link, the first inverter stage being configured to convert the boosted DC voltage into an output power having a variable output voltage and a variable output frequency the variable output voltage having a maximum voltage greater in magnitude than the fixed input AC voltage to the variable speed drive and the variable output frequency having a maximum frequency greater than the input frequency to the variable speed drive.

6. The chiller system of claim 1, wherein the variable speed drive is physically attached directly to the motor.

7. The chiller system of claim 1, wherein the transformer is physically attached directly to the variable speed drive.

8. The chiller system of claim 2, wherein the transformer is configured to provide at least two output low voltage levels, the at least two output low voltage levels including a first voltage level for the variable speed drive and other power equipment, and a second voltage level for the control panel and control equipment.

9. The chiller system of claim 2, wherein the variable speed drive includes a fluid path therethrough connected in a heat exchange relation with a fluid selected from the group consisting of:
   condenser water, chilled water, and refrigerant.

10. The chiller system of claim 2, wherein the transformer includes a fluid path therethrough connected in a heat exchange relation with a fluid selected from the group consisting of:
    condenser water, chilled water and refrigerant.

11. The chiller system of claim 2, wherein the variable speed drive also includes:
    a converter stage connected to a low voltage AC output of the transformer providing a fixed input AC voltage to the variable speed drive, the converter stage of the variable speed drive being configured to convert the fixed input AC voltage to a boosted DC voltage greater than the peak value of the fixed input AC voltage;
    a DC link connected to the converter stage, the DC link being configured to filter the boosted DC voltage and store energy from the converter stage; and
    a first inverter stage connected to the DC link, the first inverter stage being configured to convert the boosted DC voltage into an output power having a variable output voltage and a variable output frequency the variable output voltage having a maximum voltage greater in magnitude than the fixed input AC voltage to the variable speed drive and the variable output frequency having a maximum frequency greater than the input frequency to the variable speed drive.

12. The chiller system of claim 2, wherein the variable speed drive is physically attached directly to the motor.

13. The chiller system of claim 2, wherein the transformer is physically attached directly to the variable speed drive.

14. The chiller system of claim 1, wherein the transformer includes insulating heat transfer liquid or gas for cooling the transformer.

* * * * *

UNITED STATES PATENT AND TRADEMARK OFFICE
CERTIFICATE OF CORRECTION

PATENT NO.       : 7,640,767 B2
APPLICATION NO.  : 11/422964
DATED            : January 5, 2010
INVENTOR(S)      : Schnetzka et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 504 days.

Signed and Sealed this

Sixteenth Day of November, 2010

David J. Kappos
*Director of the United States Patent and Trademark Office*